United States Patent [19]

Poynter

[11] 3,997,887

[45] Dec. 14, 1976

[54] PISTON OVERTRAVEL INDICATOR

[75] Inventor: Kay S. Poynter, Owosso, Mich.

[73] Assignee: Midland-Ross Corporation, Cleveland, Ohio

[22] Filed: June 27, 1975

[21] Appl. No.: 591,050

[52] U.S. Cl. .......................... 340/242; 33/DIG. 15; 116/114 AF; 116/127; 200/82 D; 340/52 C

[51] Int. Cl.² .................... G08B 21/00; B60Q 1/26; H01H 35/38

[58] Field of Search ............... 340/242, 239 R, 282, 340/378, 52 B, 52 C; 200/82 R, 82 D, 83 W, 61.41; 116/114 AF, 124 D, 127; 33/DIG. 15

[56] References Cited

UNITED STATES PATENTS

| | | | |
|---|---|---|---|
| 444,077 | 1/1891 | Thompson et al. | 116/127 |
| 1,536,393 | 5/1925 | Hellmann et al. | 116/127 |
| 2,801,311 | 7/1957 | Gionet et al. | 200/82 R |
| 2,918,908 | 12/1959 | Herner | 200/82 R |

*Primary Examiner*—John W. Caldwell
*Assistant Examiner*—Daniel Myer
*Attorney, Agent, or Firm*—H. Duane Switzer

[57] ABSTRACT

A pressure converter for converting and intensifying pneumatic pressure to hydraulic pressure includes a pneumatic piston movable in a cylinder and connected by a rod with a smaller hydraulic piston. The pneumatic piston is movable from a rest position to normal working positions. Indicator means includes a first electrically operated signal and a second visual signal for respectively indicating overtravel and degree of overtravel of the pneumatic piston beyond the normal working positions. The pneumatic piston is engageable with the indicator means upon movement of such piston beyond its normal working positions for actuating the electrically operated signal and the visual signal.

9 Claims, 2 Drawing Figures

PISTON OVERTRAVEL INDICATOR

BACKGROUND OF THE INVENTION

This application pertains to the art of overtravel indicators and, more particularly, to such indicators for indicating overtravel of a pistion. The invention is particularly applicable for use with pressure converters used on vehicles for converting pneumatic pressure to hydraulic pressure. However, it will be appreciated that the improved indicator can be used with other devices.

Overtravel indicators of known types include those disclosed in U.S. Pat. Nos. 444,077 issued Jan. 6, 1891, to Thompson et al.; 3,772,672 issued Nov. 13, 1973, to Adahan; and 3,782,780 issued Jan 1, 1974, to Orzel.

The Thompson indicator comprises an elongated rod mounted for axial movement in one end of a cylinder and having a rod inner end located within the cylinder for being acted upon by a piston to project the rod outwardly of the cylinder and indicate how far the piston has moved. The Thompson indicator does not provide a warning for the operator of a vehicle or the like when failure is imminent or has occurred. The air brake cylinder in Thompson is normally mounted in a location on the vehicle where it is not visible to the operator and is actually used by a mechanic for adjusting the brake system. The Adahan and Orzel devices provide an electrical signal to warn the operator of a vehicle that a failure is imminent or has occurred. In these devices, safety requires that the vehicle be shut down when the signal occurs and there is no way of telling whether a complete failure has occurred or whether there is simply wear requiring adjustments.

It would be desirable to have an indicator which would provide a signal indicating when a failure is imminent or has occurred, and providing another signal indicating the degree of failure.

SUMMARY OF THE INVENTION

An indicator for indicating with two different signals overtravel and degree of overtravel of a piston movable from a rest position adjacent one end of a cylinder to normal working positions toward the other end of the cylinder.

The indicator comprises an elongated rod mounted for axial movement in the other end of the cylinder, and having an inner rod end located within the cylinder in spaced relationship to the other cylinder end and to the normal working position. Electrically operated indicating means is provided for indicating overtravel of the piston beyond the normal working positions.

The rod is also projectable varying distances outwardly of the other cylinder end simultaneously with, and subsequent to, operation of the electrical signal means for indicating the degree to which the piston has moved beyond the normal working positions.

Pressure converters are commonly used on large vehicles including earth moving equipment and the like, for supplying hydraulic fluid to various devices on the vehicle. When a complete hydraulic failure occurs as by development of a massive leak, it is obvious that the vehicle must be shut down and repairs made. However, there are many conditions in which wear has occurred and overtravel of the piston is simply due to wear of certain parts such as the brake linings which may simply require adjustment. In previous devices, overtravel of the piston would operate the warning signal and the operator would have no way of telling whether a complete failure had occurred or whether something simply required adjustment. With the improved indicator of the present application, operation of the warning signal allows the operator to check the distance which the indicator rod projects beyond the end of the cylinder. If the projecting distance is very small, the operator will know that a complete failure has not occured and it is safe to continue operating the vehicle until the end of the day when adjustments can be made on those parts requiring adjustment or repair.

The indicator of the present application includes seal means adjacent the outer end of the indicator rod for preventing entrance of foreign matter into the cylinder and into the switch operating area of the indicator rod.

A switch operating plunger is spring biased against the indicator rod for frictionally holding the rod in an extended position until it is manually reset. A groove in the indicator rod has a cam surface at one end for operating the switch plunger, and the other groove end extends substantially radially of the rod longitudinal axis for abutting the switch plunger to prevent complete insertion of the rod into the cylinder.

DESCRIPTION OF A PREFERRED EMBODIMENT

Figure 1:
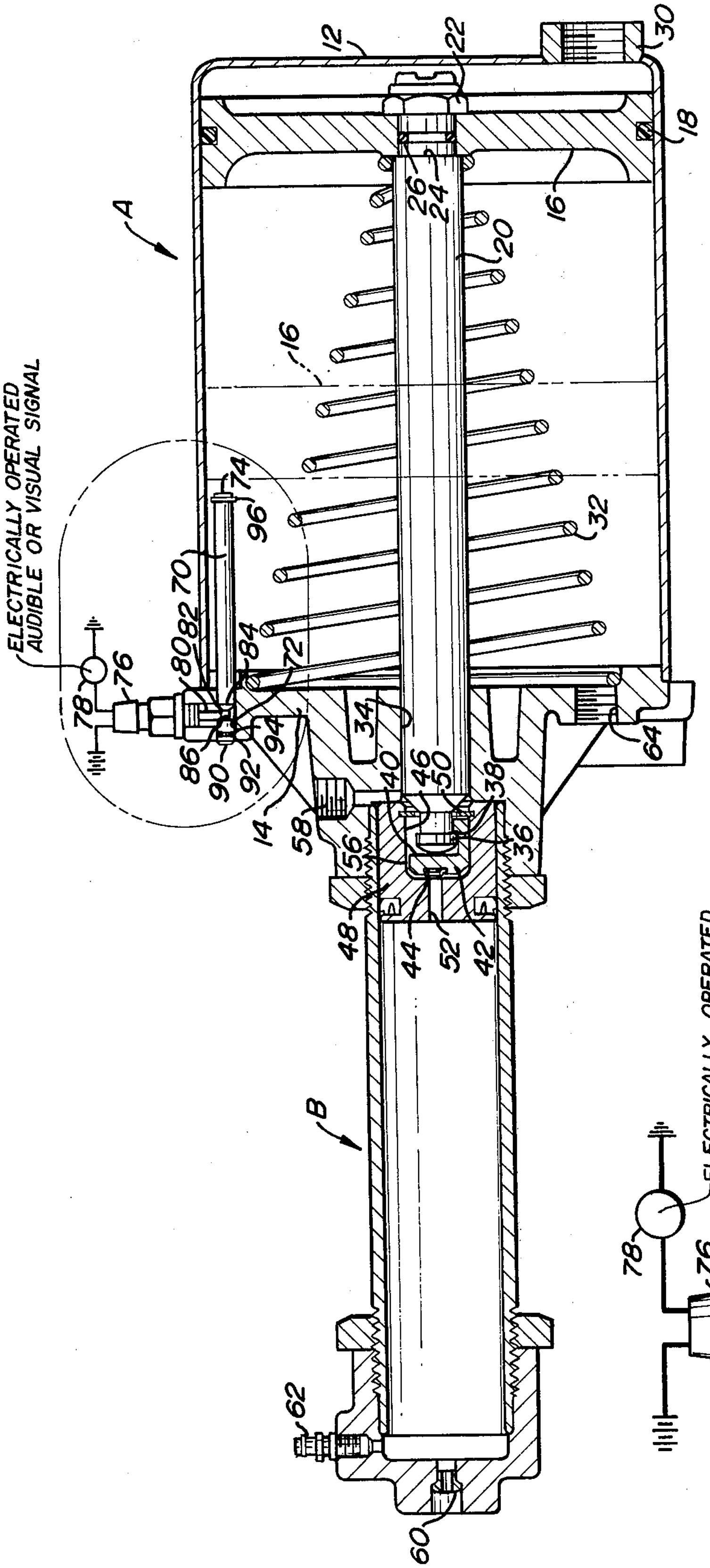
FIG. 1 is a cross-sectional elevational view of a pressure converter having the improved indicator of the present invention incorporated therein.
Figure 2:
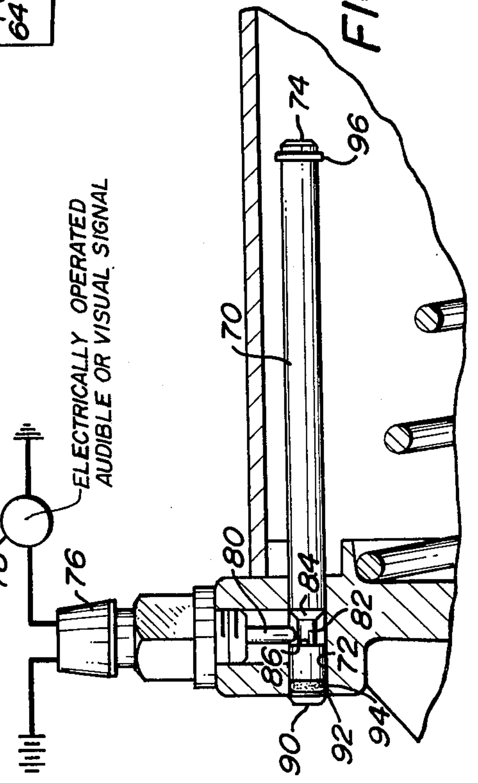
FIG. 2 is an enlarged cross-sectional eleveational view of the indicator.

With reference to the drawing, a pneumatic cylinder A has one end 12 and another end 14. A piston 16 is reciprocatingly mounted in cylinder A and has an outer peripheral seal 18. Piston 16 is secured to rod 20 as by nut 22 threaded onto a threaded end of rod 20 and securing piston 16 against rod shoulder 24. An internal seal 26 is provided between piston 16 and rod 20. An air inlet 30 is provided in cylinder end 12 for supplying air to the rear of piston 16 for moving same toward other cylinder end 14. A coil spring 32 within cylinder A bears against cylinder end 14 and piston 16 for normally biasing piston 16 to the solid line position shown in the drawing.

Rod 20 sealingly extends through a suitable bore 34 in cylinder end 14 and has a stepped rod end 36 engaged between a shoulder 38 and a surface 40 on valve member 42 carrying a seal 44. Valve member 42 is positioned in a cavity 46 in piston 48 and fixed against displacement therefrom by C-ring 50. Piston 48 has a bore 52 for establishing communication between piston cavity 46 and the interior of hydraulic cylinder B. One or more outlet passages 56 in valve member 42 provide communication of reservoir port 58 past valve member 42 with bore 52. Fitting outlets as at 60 and 62 are provided on hydraulic cylinder B for connection to various hydraulically operated devices on a vehicle or the like.

Cylinder end 14 has an opening 64 which may normally receive a filter for placing cylinder A under atmospheric pressure forwardly of piston 16.

In operation of the pressure converter, a suitable valve is opened for supplying pressurized air through inlet 30 to the rear of piston 16 for moving same to the left in the drawing toward other cylinder end 14. Rod 20 moves valve member 42 so that seal 44 blocks bore 52. Piston 48 then moves within hydraulic cylinder B for supplying hydraulic pressure through outlets 60 and 62. Hydraulic fluid is free to flow to the rear of the moving piston 48 through reservoir port 58. When the air pressure to the rear of piston 16 is relieved, spring 32 acts for moving piston 16 back to the solid line position shown in the drawing. Initial return movement moves valve member 42 to the position shown in the drawing wherein seal 44 is spaced from bore 52 so that hydraulic fluid can flow from the rear of piston 48 to the front end thereof through bore 52.

Piston 16 normally occupies adjacent cylinder end 12. When air pressure is supplied through inlet 30, piston 16 moves to various working positions toward other cylinder end 14 depending upon the pressure supplied to the rear of the piston 16. One such normal working position is shown for piston 16 in shadow line. When all of the parts supplied with hydraulic fluid by the pressure converter are in proper working order and adjustment, piston 16 will never move beyond a furthest normal working position shown by the shadow lines. It is only when a failure occurs or excessive wear exists that piston 16 will move beyond the normal working position illustrated by the shadow lines further toward other cylinder end 14.

The improved indicator of the present application includes an elongated cylindrical rod 70 mounted for axial movement in a bore 72 in other cylinder end 14. Rod 70 has an inner end 74 which is spaced from cylinder end 14 and from the normal working positions of piston 16.

Normally open switch means 76 is suitably mounted on cylinder end 14 for selectively operating electrical indicating means 78 which may be in the form of a light or buzzer. Switch operating means comprises a reciprocating plunger 80 which is normally spring biased toward rod 70. A circumferential groove 82 in rod 70 has one end in the form of a cam surface 84 sloping outwardly from the longitudinal axis of rod 70 toward inner end 74 thereof. Other end 86 of groove 82 extends substantially radially of the longitudinal axis of rod 70. The outer end portion of plunger 80 is positioned in groove 82.

Rod 70 has an outer end 90 located slightly outside of cylinder end 14, and a circumferential groove 92 in rod 70 adjacent rod outer end 90 receives an O-ring seal 94 compressed between the bottom of groove 92 and bore 72 for preventing the entrance of foreign matter into the area of the switch plunger and its cooperating means on rod 70 for actuating same. Such seal also precludes entrance of foreign matter into cylinder A. Rod 60 has a circumferential groove adjacent inner end 74 thereof receiving a C-ring 96 providing an enlargement which prevents complete outward displacement of rod 70 through bore 72.

During operation of the device, when piston 16 moves beyond its normal working position further towards cylinder end 14, piston 16 acts against inner rod end 74 for moving rod 70 axially. Cam surface 84 on rod 70 acts against switch plunger 80 for closing switch 76 and operating electrical indicating means 78 which is normally located in the cab of the vehicle where it can be seen or heard immediately by the operator. Upon operation of signal 78, the operator can stop the vehicle and get out to check how far rod outer end 90 extends outwardly from cylinder end 14. If the projecting distance is very small, the operator will know that some parts, such as the brake linings, have simply become worn to the point where adjustment or replacement is necessary, and it is safe to continue operating the vehicle until repairs can be made. On the other hand, if a substantial length of rod 70 is projecting outwardly of cylinder end 14, it will tell the operator that a complete failure has occured and it is not safe to operate the vehicle until repairs have been made.

Radial groove end surface 86 cooperates with switch plunger 80 for preventing complete insertion of rod 70 into cylinder A. The improved indicating arrangement of the present application indicates when a failure is imminent or has occured by operation of signal 78, and also indicates the degree to which the failure has occured by the length of rod 70 which is projecting outwardly beyond cylinder end 14. After repairs or adjustments are made, indicator rod 70 is simply manually pushed back into the position shown in the drawing. The improved indicator of the present application performs the dual function of indicating failure and degree of failure without requiring two separate devices because the same rod 70 which indicates degree of failure by its projecting length also operates switch 76. Rod 70 may have spaced indicia thereon if so desired to indicate the length which projects outwardly beyond cylinder end 14. Having spring biased switch plunger 80 bear directly against indicator rod 70 eliminates the need for separate springs for holding rod 70 in a projected position after a failure has occured. Mounting rod 70 in a bore 72 formed directly in cylinder end 14 greatly simplifies manufacture and assembly of the indicating device as compared to arrangements wherein a separate sleeve is attached to the cylinder end for mounting the indicator rod.

The electrically operated indicating means 78 is operated by only slight axial movement of indicator rod 70 due to slight movement of piston 16 beyond its normal working positions. Further movements of piston 16 beyond its normal working positions will progressively indicate degree of overtravel by projecting rod 70 further outwardly of cylinder end 14.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. An overtravel indicator for indicating with two different signals overtravel and degree of overtravel of a piston movable from a rest position adjacent one end of a cylinder to normal working positions toward the other end of the cylinder, comprising; an elongated rod mounted for axial movement in said other end of said cylinder and having an inner rod end located within said cylinder in spaced relationship to said other end and to said normal working positions, electrically operated indicating means for indicating overtravel of said piston beyond said normal working positions, switch means for energizing said electrically operated indicating means, cooperating means on said rod for actuating said switch means upon slight axial movement of said rod when said piston moves beyond said normal working positions and acts on said inner rod end, and said rod being projectable varying distances outwardly of said other end for indicating the degree which said piston moves beyond said normal working positions.

2. The indicator of claim 1 wherein said rod is mounted for axial movement in a bore in said other end of said cylinder and has an outer rod end, and seal means between said bore and rod adjacent said outer rod end for preventing entrance of foreign matter into said cylinder.

3. The indicator of claim 2 wherein said rod has a circumferential groove therein adjacent said outer rod end and said seal means being positioned in said groove.

4. The indicator of claim 2 wherein said cooperating means on said rod for actuating said switch means is located toward said inner rod end from said seal means.

5. The indicator of claim 1 wherein said cooperating means on said rod for actuating said switch means comprises a circumferential groove in said rod having a cam surface at one groove end sloping outwardly from the longitudinal axis of said rod toward said inner rod end, the other end of said groove extending substantially radially from the longitudinal axis of said rod, and said switch operating means comprising a reciprocating plunger having an outer plunger end portion received in said groove.

6. The indicator of claim 1 wherein said rod is mounted for axial movement in a bore in said other end of said cylinder and said rod has an enlargement thereon adjacent said inner rod end for preventing complete outward displacement of said rod through said bore.

7. The indicator of claim 1 wherein said piston comprises a pneumatic piston of a pressure converter for converting and intensifying pneumatic pressure to hydraulic pressure, and pneumatic piston being connected with a smaller hydraulic piston by a push rod.

8. In a pressure converter for converting and intensifying pneumatic pressure to hydraulic pressure and including a pneumatic piston movable in a cylinder and connected by a rod with a smaller hydraulic piston, said pneumatic piston being movable from a rest position to normal working positions, indicator means including a first electrically operated signal and a second visual signal for respectively indicating overtravel and degree of overtravel of said pneumatic piston beyond said normal working positions, a movable indicator member for operating said first and second signals, said pneumatic piston being engageable with said indicator member only upon movement of said pneumatic piston beyond said normal working positions for moving said indicator member and placing said first and second signals in their operated positions.

9. The converter of claim 8 wherein said indicator member includes an elongated axially movable rod.

* * * * *